(No Model.)

A. BERTRAM.
SAW

No. 336,380. Patented Feb. 16, 1886.

Witnesses.
W. J. Graham
Charles C. Baldwin

Inventor.
Alexander Bertram
by Donald C. Ridout & Co.
Attys.

UNITED STATES PATENT OFFICE.

ALEXANDER BERTRAM, OF TORONTO, ONTARIO, CANADA.

SAW.

SPECIFICATION forming part of Letters Patent No. 336,380, dated February 16, 1886.

Application filed June 20, 1885. Serial No. 169,264. (No model.) Patented in Canada July 14, 1885, No. 22,074.

*To all whom it may concern:*

Be it known that I, ALEXANDER BERTRAM, of the city of Toronto, in the county of York, in the Province of Ontario, Canada, merchant, have invented a certain new and useful Improvement in Saws, of which the following is a specification.

The object of the invention is to design a fast-cutting saw capable of cutting so clean a parting that but little friction is produced, and that the same saw may be used for either cross-cut or ripping purposes; and it consists, essentially, of a series of plowing or mortise teeth, the cutting-edges of which are substantially at right angles to the surface of the saw, each mortise or plowing tooth being preceded by two or more chisel-shaped teeth, the cutting-edges of which are alternately formed on the opposite sides of the surface of the saw, and are beveled in the opposite direction to that in which the mortise-teeth are sloped, so that each chisel-shaped tooth shall be applied to its work in exactly the manner in which a turning-chisel is set, thereby insuring a clean cut down the walls of the parting made by the mortise or plowing teeth.

Figure 1:
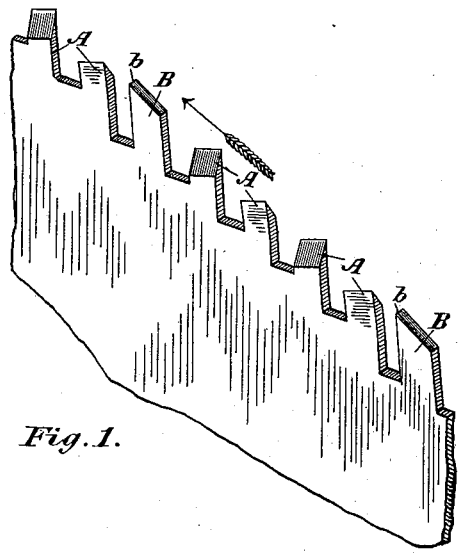
Figure 2:
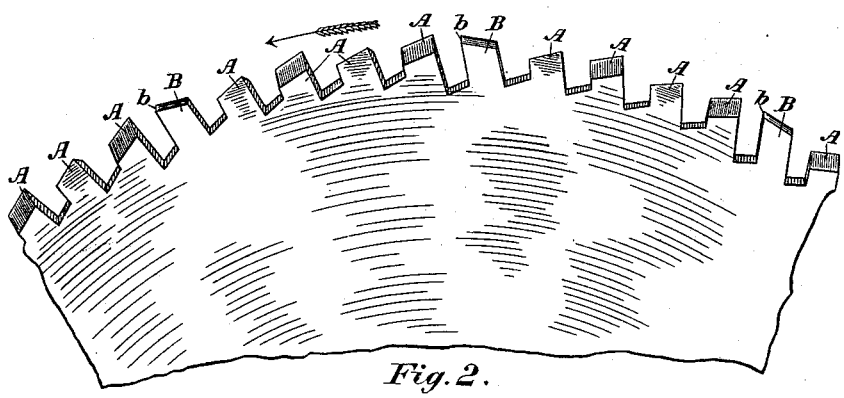

Figure 1 is a perspective view showing my improved teeth applied to a straight saw. Fig. 2 is a similar view of my improved teeth applied to a circular saw.

In the drawings I represent merely segments of saws, as they are sufficient to exhibit the principle of my invention. I have shown four chisel-teeth, A, placed between each pair of mortise or plowing teeth B; but of course it will be understood that it is only necessary to place two chisel-teeth between each pair of mortise-teeth, the cutting-edges of the said chisel-teeth being formed on opposite sides of the saw.

The arrows indicate the direction in which the saws move when cutting, and it will be noticed that the cutting-edges $b$ of the mortise-teeth B are formed substantially at right angles to the surface of the saw, and that the outer or top edge of these teeth is beveled or sloped down from the cutting-edge $b$, so as to leave clearance behind the cutting-edge. It will further be noticed that the cutting-edges of the teeth A are sharpened from the side or surface of the saw, and, being sharpened on different sides alternately, the walls of the parting on either side of the mortise or plowing teeth B are shaved by the action of the chisel-shaped teeth A, the cutting-edges of which, it should be further noticed, are beveled or sloped in the opposite direction to that in which the ends or tops of the teeth B are sloped, so that in actual work each tooth acts in precisely the same manner as an ordinary turning-chisel, thereby making so clean a cut down the walls of the parting formed by the saw that a minimum amount of friction is produced by the working of the saw, and the saw itself may be used either for crosscutting or ripping purposes.

What I claim as my invention is—

1. In a saw, a series of mortise or plowing teeth, B, having their cutting-edges substantially at right angles to the surface of the saw, the mortise-teeth being separated by two or more chisel-shaped teeth, A, substantially as and for the purpose specified.

2. In a saw, a series of mortise or plowing teeth, B, the cutting-edges of which are substantially at right angles to the surface of the saw, each mortise or plowing tooth being preceded by two or more chisel-shaped teeth, A, the cutting-edges of which are alternately formed on the opposite sides of the surface of the saw and beveled in the opposite direction to the bevel of the mortise-teeth, substantially as and for the purposes specified.

Toronto, June 6, 1885.

ALEX. BERTRAM.

In presence of—
CHARLES C. BALDWIN,
F. B. FETHERSTONHAUGH.